US007756521B2

(12) United States Patent
Gerlach et al.

(10) Patent No.: US 7,756,521 B2
(45) Date of Patent: Jul. 13, 2010

(54) METHOD FOR SUBCARRIER ALLOCATION AND MODULATION SCHEME SELECTION IN WIRELESS MULTICARRIER TRANSMISSION SYSTEM

(75) Inventors: Christian Georg Gerlach, Ditzingen (DE); Paul A. M. Buné, Kornwestheim (DE); Manfred Litzenburger, Bruchsal (DE)

(73) Assignee: Alcatel, Paris (FR)

( * ) Notice: Subject to any disclaimer, the term of this patent is extended or adjusted under 35 U.S.C. 154(b) by 422 days.

(21) Appl. No.: 10/945,943

(22) Filed: Sep. 22, 2004

(65) Prior Publication Data

US 2005/0085236 A1 Apr. 21, 2005

(30) Foreign Application Priority Data

Oct. 21, 2003 (EP) .................................. 03292629

(51) Int. Cl.
*H04B 7/00* (2006.01)
*H04W 4/00* (2009.01)
*H04W 72/00* (2009.01)

(52) U.S. Cl. ...................... 455/450; 455/45; 455/422.1

(58) Field of Classification Search .................. 455/45, 455/422.1, 450
See application file for complete search history.

(56) References Cited

U.S. PATENT DOCUMENTS

| | | | | |
|---|---|---|---|---|
| 5,726,978 | A * | 3/1998 | Frodigh et al. | 370/252 |
| 5,926,135 | A * | 7/1999 | Minkoff | 342/379 |
| 5,930,706 | A * | 7/1999 | Raith | 455/422.1 |
| 6,530,056 | B1 * | 3/2003 | Boxall et al. | 714/749 |
| 2002/0080774 | A1 * | 6/2002 | Griffith et al. | 370/352 |
| 2003/0231715 | A1 * | 12/2003 | Shoemake et al. | 375/267 |

FOREIGN PATENT DOCUMENTS

| | | |
|---|---|---|
| WO | 95/10144 | 4/1995 |

OTHER PUBLICATIONS

A. Garcia, "CSMA Multiuser Bit Loading Algorithm for Multicarrier Wireless Local Area Networks", VTC 2001 Spring. IEEE VTS 53$^{RD}$. Vehicular Technology Conference. Rhodes, Greece, May 6-9, 2001, IEEE Vehicular Technology Conference, NY, NY, IEEE, vol. 2 of 4, Conf. 53 May 6, 2001, pp. 1099-1103, XP001067130.

(Continued)

*Primary Examiner*—Patrick N Edouard
*Assistant Examiner*—Matthew W Genack
(74) *Attorney, Agent, or Firm*—Sughrue Mion, PLLC

(57) ABSTRACT

A method for allocating subcarrier frequencies to a user terminal in a wireless system using multi-carrier modulation such as OFDM in which a network is adapted to communicate with a plurality of user terminals for data transmission, signaling control and link adaptation via an air interface downlink channel and feedback channel, and where a number of terminals estimate their own specific channel transfer function, wherein upon terminal channel transfer function estimation over a certain period of time, a set of terminals report to the network, over their feedback channel, information about their measured channel transfer function and interference noise estimate and the network, according to this information, allocates the subcarrier frequencies of at least one first frequency subset to the set of terminals which sent said information following a frequency-selective allocation scheme and allocates the subcarrier frequencies of at least one second frequency subset to the rest of the terminals according to a frequency interleaving scheme.

27 Claims, 3 Drawing Sheets

R0 R1 ... R7 ...
f
SU1 SU2 SU1 SU2 SU1 SU2

OTHER PUBLICATIONS

S. Chari, “Adaptive subcarrier selection for mitigating Bluetooth interference in OFDM based wireless LANs operating at 2.4 GHz”, Digital Wireless Communications V, Orlando, FL, USA, Apr. 21-22, 2003, vol. 5100, pp. 10-18, XP002277260—Proceedings of the SPIE—The International Society for Optical Engineering, 2003, SPIE-Int. Soc. Opt. Eng., USA.

Z. Wang et al, “Improving Performance of Multi-User OFDM Systems Using Bit-Wise Interleaver”, Electronics Letters, Sep. 13, 2001, vol. 37, No. 19—two pages.

A. Garcia, “CSMA Multiuser Bit Loading Algorithm for Multicarrier Wireless Local Area Networks”, VTC 2001 Spring. IEEE VTS 53$^{rd}$. Vehicular Technology Conference. Rhodes, Greece, May 6-9, 2001, IEEE Vehicular Technology Conference, NY, NY, IEEE, vol. 2 of 4, Conf. 53 May 6, 2001, pp. 1099-1103, XP001067130.

S. Chari, “Adaptive subcarrier selection for mitigating Bluetooth interference in OFDM based wireless LANs operating at 2.4 GHz”, Digital Wireless Communications V, Orlando, FL, USA, Apr. 21-22, 2003, vol. 5100, pp. 10-18, XP002277260 - Proceedings of the SPIE - The International Society for Optical Engineering, 2003, SPIE-Int. Soc. Opt. Eng., USA.

Z. Wang et al, “Improving Performance of Multi-User OFDM Systems Using Bit-Wise Interleaver”, Electronics Letters, Sep. 13, 2001, vol. 37, No. 19 - two pages.

* cited by examiner

METHOD FOR SUBCARRIER ALLOCATION AND MODULATION SCHEME SELECTION IN WIRELESS MULTICARRIER TRANSMISSION SYSTEM

BACKGROUND OF THE INVENTION

The invention is based on a priority application EP 03292629.7 which is hereby incorporated by reference.

The present invention relates to wireless communications systems, and more particularly, to a method for allocating subcarriers and selecting a modulation scheme per subcarrier in a high-speed wireless fixed or mobile multi-carrier system.

An approach to multi-carrier modulation is Orthogonal Frequency Division Multiplexing (OFDM). OFDM was for example standardized for the two high-speed digital radio transmission systems Digital Audio Broadcasting (DAB) and Digital Video Broadcasting Terrestrial transmission mode (DVB-T), which are used for transmitting digital radio and television signals. A further field of application, for which the OFDM transmission system plays an increasing role, is the mobile access to wire-bound networks with the aid of a local radio network, whereby high data rates shall also be transmitted. In this connection, the HIPERLAN/2 standard as well as an extension of the IEEE 802.11a standard for the 5 Ghz area con be mentioned. In both systems OFDM transmission is applied. OFDM could also offer a sensible alternative for high-speed mobile applications, and thus represents an important step for next generation mobile radio systems or for a $4^{th}$ generation air interface.

In conventional multi-carrier schemes the transmitted data is split into a number of parallel data streams, each one used to modulate a separate subcarrier. If an OFDM transmission system is applied, the broadband radio channel is subdivided into a plurality of narrow-band subchannels or subcarriers being independently modulated with e.g. QPSK, 16 QAM, 64 QAM or higher modulation order allowing higher data rate per subcarrier. The higher modulation orders however can only be used if the signal to noise ratio (SNR) at the receiver is high enough to allow the demodulation. The subcarrier frequencies can be allocated to a user channel on a short term basis and the modulation order per subcarrier has to be selected to define a transmission channel for each user.

In a terrestrial mobile environment with multipath radio channels there is the possibility of a very strong channel attenuation of single subcarriers. This means that some subcarriers allocated to the user may be useless because of fading. In order to compensate the fading of some subcarriers, a known method, which is disclosed in document “Improving performance of multi-user OFDM systems using bit-wise interleaver” (Electronic Letters, $13^{th}$ Sep. 2001, vol. 37, No. 19) by Z. Wang and R. A. Stirling Gallacher, proposes the allocation of subcarriers to a user channel according to a frequency interleaving scheme, that is the frequencies for the subcarriers allocated to a user channel are picked far enough apart so that they can experience different attenuation. By following this method, the bits are distributed over these subcarriers and an averaging effect is achieved, so that on average the raw bit error rate is acceptably low and a Forward Error Correction (FEC) coding mechanism is able to correct the bit errors.

While this allocation method significantly reduces the problem of fading, it still allocates subcarriers which can be useless for downlink transmission with a mobile station. Moreover, subcarriers may be allocated to a specific user channel which experience severe attenuation for this user and are thus not useful for downlink transmission to him, but which could be perfectly adequate, because not faded, for transmission to another user. Still another disadvantage of frequency interleaving allocation is that channel coding for the resulting bit error rate needs a lot of redundancy which reduces the usable net bit rate that can be transmitted over the channel.

SUMMARY OF THE INVENTION

It is the object of the invention to solve the aforesaid technical problems of the prior art and provide an improved subcarrier allocation method for high-speed wireless mobile multi-carrier systems such as OFDM by using a transmission that is matched to each terminal’s preferred reception capabilities.

The object is achieved according to the invention by a method for allocating subcarrier frequencies to a user terminal in a wireless system using multi-carrier modulation such as OFDM in which a network is adapted to communicate with a plurality of user terminals for data transmission, signaling control and link adaptation via an air interface downlink channel and feedback channel, and where a number of terminals estimate their own specific channel transfer function, wherein upon terminal channel transfer function estimation over a certain period of time, the terminals report to the network, over their feedback channel, if their channel transfer function is predictable or not and if they want to participate in a frequency-selective subcarrier allocation method or not;

depending on the information about the number of terminals participating in the frequency-selective allocation procedure, their respective traffic demands and their channel transfer function characteristics, the network partitions the subcarrier frequency set available in at least two logical blocks or frequency subsets;

the participating terminals report back to the network information about their measured channel transfer function and interference noise estimate through the feedback channel;

the network, according to this information, allocates the subcarrier frequencies of at least one frequency first subset to the participating terminals following a frequency-selective allocation scheme by assigning to said terminals subcarriers that are useful for transmission according to their feedback information about the channel transfer function and allocates the subcarrier frequencies of at least one second frequency subset to the rest of the terminals according to a frequency interleaving scheme.

It is also achieved by a network element comprising means for subcarrier frequency allocation to a plurality of user terminals in a wireless system using multi-carrier modulation according to the method described above;

a user terminal comprising means for estimating its channel transfer function and interference noise over a certain period of time and reporting back to the network said information about their measured channel transfer function and/or interference noise estimate through the feedback channel; and a radio resource manager entity performing subcarrier frequency allocation to a plurality of user terminals in a wireless system using multi-carrier modulation according to the method described above.

Advantageous configurations of the invention emerge from the dependent claims, the following description and the drawings. For example, it is seen advantageous that, by using the proposed invention, the modulation scheme for every subcarrier frequency can be also selected, and the highest order modulation (e.g. 64 QAM) is used for as many terminals as possible, so that the maximum radio cell traffic throughput for the whole system can be improved in order to serve as many subscriber as possible and that higher data transmission rates are achieved. Also advantageous is that less channel coding/decoding complexity is needed in the user terminal.

BRIEF DESCRIPTION OF THE DRAWINGS

An embodiment example of the invention is now explained with the aid of FIGS. 1 to 5.

DETAILED DESCRIPTION OF THE DRAWINGS

Figure 1:
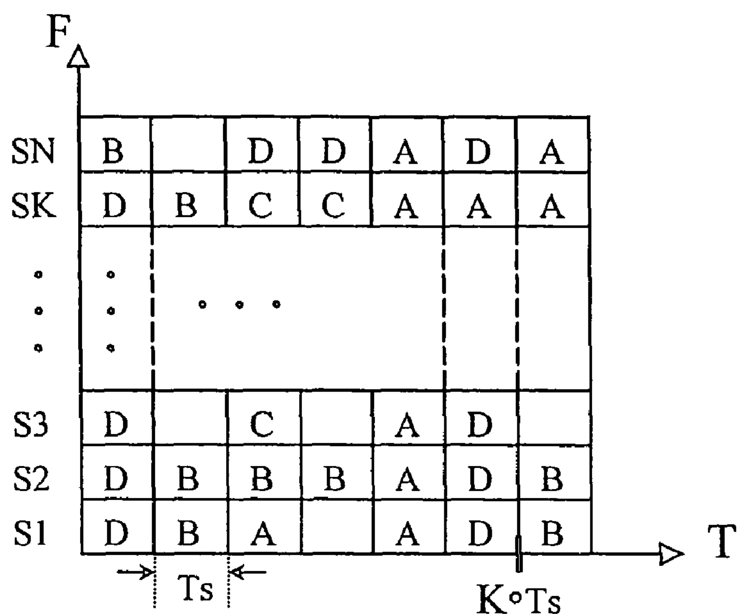
FIG. 1 shows an example of a mapping of subcarriers to a user channel into a time-frequency grid of OFDM.

FIG. 1 shows an exemplary allocation of subcarriers S1 to SN to four user channels A, B, C, D into an OFDM time-frequency T-F grid.

OFDM offers the possibility to flexibly allocate one or more subcarriers S1 to SN to one user or one logical channel A, B, C, D to control the data rate for this user channel. Since this can change also over time in a TDMA system (e.g. with a change period of K symbol periods Ts e.g. a period of 2 ms), we have a 2-dimensional resource allocation grid as indicated in FIG. 1.

Some of the time-frequency grid locations may not be available for data transmission, because they are used for carrying pilot or signaling information. User assignment of remaining locations can be done based on frequency or time or a combination of both.

Figure 2:
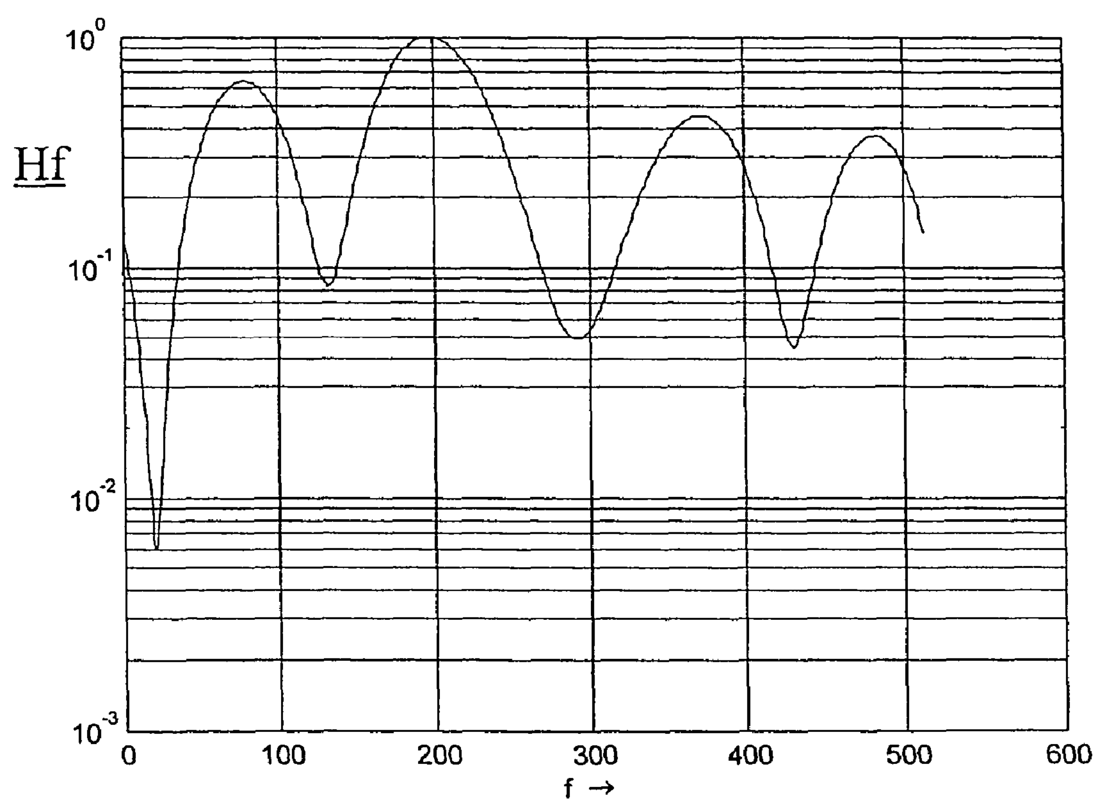
FIG. 2 shows an example of a diagram of a user channel transfer function with frequency-selective fading.

FIG. 2 shows an example of a diagram of a user channel transfer function Hf with frequency-selective fading over a 5 Mhz bandwidth.

In wideband wireless communications, severe frequency-selective fading due to multipath spreading causes a decline in user channel quality. The OFDM signal can have, for example 300 or 700 subcarriers over the bandwidth of 5 Mhz and as thus the SNR per subcarrier at the receiver is also highly different over the frequency, that is, some carriers are strongly attenuated while others are not.

A user channel transfer function Hf, such as the one shown in FIG. 2, is unique and specific for each user terminal and its current reception condition. The user channel transfer function Hf is subject to variations, for example caused by the mobility of the users or by adjacent transmission interference. Such channel estimation must be then performed in the OFDM receiver by methods known in the art in order to improve the quality of data reception.

Figure 3:
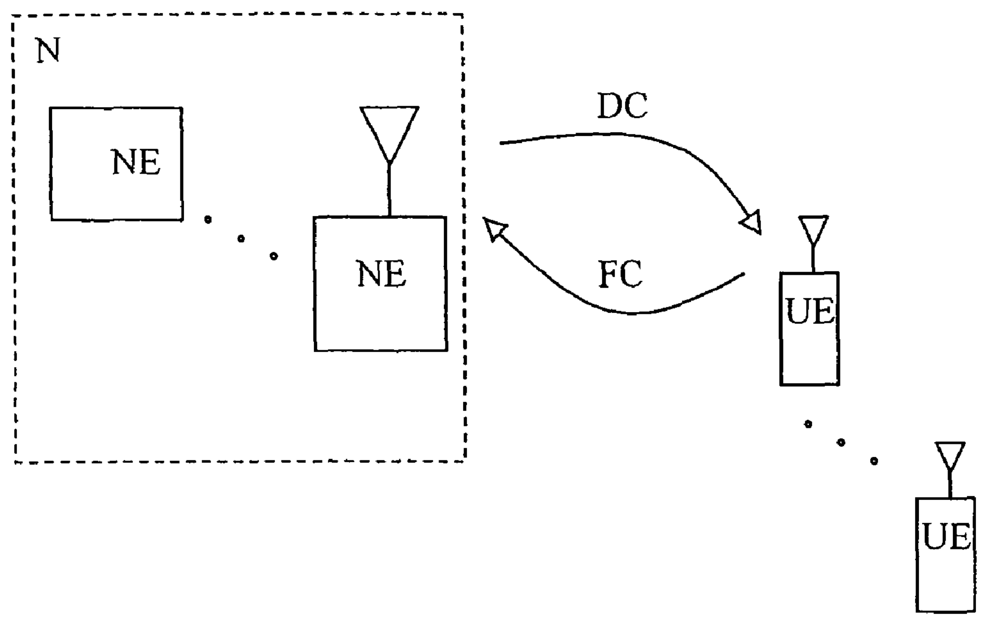
FIG. 3 shows a block diagram of a mobile communications system comprising means for subcarrier frequency allocation to a user terminal according to the invention.

FIG. 3 shows a block diagram of a mobile communications system in which a mobile radio network N, including a plurality of network elements NE, and a plurality of user terminals UE exchange data information via an air interface downlink channel DC and a feedback channel FC using multi-carrier modulation schemes, at least in the downlink, such as OFDM; the network N and the user terminal UE comprising means for subcarrier frequency allocation according to the invention.

The invention starts from the first observation that since, as indicated in the FIG. 2 example, there are many user channel transfer functions Hf on a cell at the same time which are typically different, the probability that one subcarrier frequency is attenuated for all the user terminals UE in a radio cell is nearly zero. Furthermore, the invention starts from the second observation that, while some user terminals UE are moving fast and experience a quickly changing and unpredictable channel transfer function Hf with unpredictable frequency selectivity, there is a number of user terminals UE that experience a roughly stationary or slowly changing channel situation where the channel transfer function Hf is predictable for some transmission time intervals in advance.

According to the invention then, and the aforementioned observations, it is possible to allocate specific subcarriers to the user terminals UE based on the knowledge of their unique channel transfer function Hf, that is, such knowledge about the useful or useless subcarriers for a specific terminal is used then by the network N for the allocation process.

According to the invention, once the terminals UE have estimated their channel transfer function Hf over a certain period of time, they report to the network N, over their feedback channel FC, if their channel transfer function Hf is predictable or not and if they want to participate in the frequency-selective subcarrier allocation method or not. Depending on the information, for example, about the number of terminals UE participating in the frequency-selective allocation procedure, their respective traffic demands and their channel transfer function Hf characteristics, the network N partitions the available OFDM time-frequency T-F grid shown in FIG. 1 in at least two logical blocks or frequency subsets, at least a first subset containing the frequencies that are used for frequency-selective allocation for the terminals with predictable channel transfer function Hf and which want to participate on this allocation process and at least a second subset with the frequencies that are used for conventional frequency interleaving allocation in case of terminals with no predictable transfer function Hf or the ones which do not want to participate in the frequency-selective allocation method. The participating terminals UE report then back to the network N information about their measured channel transfer function Hf and, if required, interference noise estimate through the feedback channel FC. The network N, according to this information, allocates the subcarrier frequencies from the first subset to the participating terminals in the frequency-selective allocation method by assigning to said terminals subcarriers that are useful for transmission according to their channel transfer function Hf and allocates the other subcarrier frequencies from the second subset to the rest of the terminals according to a conventional frequency interleaving scheme as described previously.

Also according to the invention, the network N, when allocating the subcarrier frequencies to the participating terminals, can further determine the modulation scheme (e.g. QPSK, 16 QAM, 64 QAM) for said subcarriers.

This allocation procedure is done repetitively, and the frequency-selective allocation lasts an appropriate time interval, in the order of the radio channel coherence time during which stationarity can be assumed, until new participating user terminal UE channel transfer function Hf reports are available again.

The subcarrier allocation principle is also open to incorporate in the allocation process other factors like user/service demand or user/service priority achieving always the best cell throughput possible under these constraints.

The way the participating terminals UE report back to the network N information about their measured channel transfer function Hf and interference noise estimate according to the invention through the feedback channel FC should, in an preferred embodiment to reduce feedback traffic, be in a coded compressed form. For example, this can be done by sending the quantized measurement values on specific pilot subcarriers and, if required, possibly an additional quantized noise estimate; or by sending the estimated delay and amplitude values of the channel impulse response in quantized form and an additional noise estimate; or by just describing on which subcarriers a certain modulation scheme is useful and where not. This last method is done for example by sending an integer function over the axis of subcarrier frequencies indicating which respective modulation scheme (e.g. QPSK, 16 QAM, 64 QAM) on which frequencies are adequate for transmission and on which frequencies not.

This last scheme uses the observation that the sending network usually only has the choice between a very limited number of modulation schemes.

Figure 4:
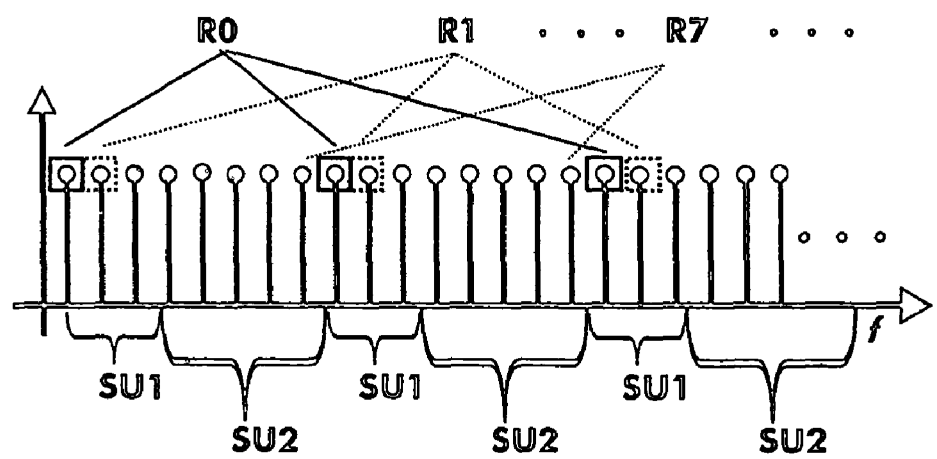
FIG. 4 shows an example of a suitable partitioning of the subcarrier frequency set in two logical blocks of frequency subsets according to the invention.

FIG. 4 shows an example of a suitable partitioning of the subcarrier frequency set available in two logical blocks of frequency subsets SU1 and SU2, in which the first subset SU1 comprises rasters R0, R1 and R2 and the second subset SU2 comprises rasters R3 to R7.

As shown in the example of the figure, the mobile radio network N partitions the axis of discrete subcarrier frequencies in e.g. 8 interleaved subsets of equally spaced frequency points which we call frequency rasters. So in our example we have frequency rasters R0 to R7. This way, frequency diversity is provided in both subsets SU1 and SU2, the first subset SU1 being used for frequency-selective allocation procedure and the second subset SU2 being used for frequency interleaving allocation.

It shall be understood that FIG. 4 is just an example of a possible partition method and that more ways of doing said partition are possible, for example, it is possible to do a partition in more subsets or it is possible that any of the subsets is assigned zero frequencies, which would mean that a single set of frequencies would be available for allocation. As also mentioned above when explaining FIG. 1, the partitioning of the time-frequency grid can also be made over time and frequency and said partitioning being used for the allocation method.

Figure 5:
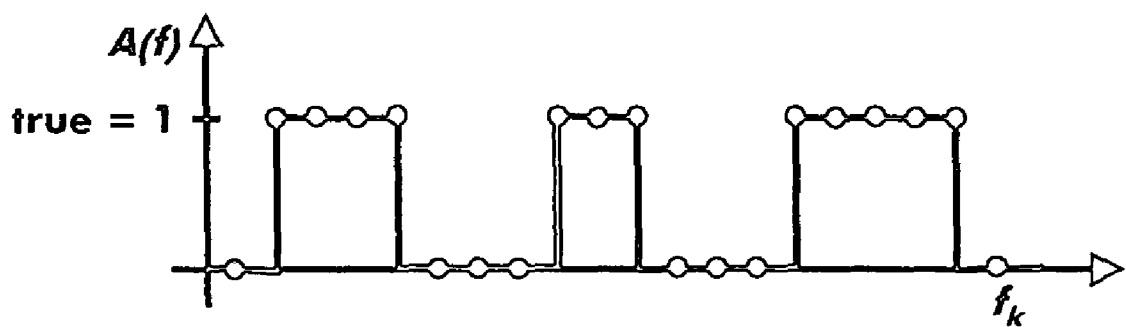
FIG. 5 shows an example of a way for sending specific information to the mobile radio network about the user channel transfer function.

FIG. 5 shows an example of a way for sending specific information to the network N about the user channel transfer function. This is done by sending the considered modulation scheme (e.g. QPSK, 16 QAM, 64 QAM) as an index and an integer function A(f) indicating which frequencies are adequate for transmission with this modulation scheme and which not.

Said integer function can be also sent in a further compressed form by a source coding algorithm such as run-length coding to minimize traffic on the feedback channel FC. The principle can also be generalized to the case of a multiple input multiple output (MIMO) system where the feedback information is given separately for the different sending antennas of the network N.

For the sake of generalization, it shall be understood, that although for the explanation of the present invention an OFDM modulation scheme has been used, the above proposals can in principle as well be adopted to any multi-carrier modulation scheme apart from OFDM.

It shall also understood that the allocation method herein described can be implemented anywhere in the mobile radio network N, that is, in a network element NE such as a base station or a radio network controller or by means of a radio resource manager entity, inside or outside the network elements NE, which carries out the allocation algorithm as well. This radio resource manager entity can be implemented by hardware or software means.

It is also possible to apply a subcarrier allocation and modulation scheme selection in the uplink channel for data transmission from the terminal to the network using the same principles.

The invention claimed is:

1. A method for allocating subcarrier frequencies to a user terminal in a wireless telecommunications system using multi-carrier modulation in which a network is adapted to communicate with a plurality of user terminals for data transmission, signaling control and link adaptation via an air interface downlink channel and feedback channel, and where a number of terminals estimate their own specific channel transfer function, described by the following steps:

upon terminal channel transfer function estimation over a certain period of time, the terminals report to the network, over their feedback channel, if their channel transfer function is predictable or not and if they want to participate in a frequency-selective subcarrier allocation method or not;

depending on the information about the number of terminals participating in the frequency-selective allocation procedure, their respective traffic demands and their channel transfer function characteristics, the network partitions the subcarrier frequency set available in at least two logical blocks or frequency subsets;

the participating terminals report back to the network information about their measured channel transfer function and interference noise estimate through the feedback channel; and the network, according to this information, allocates the subcarrier frequencies of at least one first frequency first subset to the participating terminals following a frequency-selective allocation scheme by assigning to said terminals subcarriers that are useful for transmission according to their feedback information about the channel transfer function and allocates the subcarrier frequencies of at least one second frequency subset to the rest of the terminals according to a frequency interleaving scheme.

2. The method of claim 1 characterized in that the network further determines the modulation scheme for the subcarriers allocated to the terminals.

3. The method of claim 1 characterized in that the participating terminals report back to the network information about their measured channel transfer function and/or interference noise estimate through the feedback channel in a coded compressed form.

4. The method of claim 3 characterized in that the participating terminals report back to the network the quantized measurement values on specific pilot subcarriers.

5. The method of claim 3 characterized in that the participating terminals report back to the network the estimated delay and amplitude values of the channel impulse response in quantized form.

6. The method of claim 3 characterized in that the participating terminals report back to the network an integer function over the axis of subcarrier frequencies indicating which respective modulation scheme on which frequencies are adequate for transmission and on which frequencies not.

7. The method of claim 6 characterized in that said integer function is sent in a compressed form by a source coding algorithm.

8. The method of claim 1 characterized in that the network further assigns the subcarrier frequencies for the terminals participating on the frequency-selective scheme taking into account user/service demand or user/service priority.

9. A network element comprising:

means for receiving user terminal information and information about their channel transfer function and interference noise estimate;

wherein a user terminal comprises means for estimating channel transfer function of the user terminal and interference noise over a certain period of time and reporting back to a network information on whether the channel transfer function is predictable and information on whether the user terminal is a participating terminal in a frequency-selective subcarrier allocation method through a feedback channel;

means for partitioning the subcarrier frequency set available in at least two logical blocks or frequency subsets; and means for allocating the subcarrier frequencies of at least one first frequency subset to the participating terminals following a frequency-selective allocation scheme by assigning to said terminals subcarriers that are useful for transmission according to their feedback information about the channel transfer function, wherein subcarrier frequencies in the first frequency subset are not allocated according to a frequency interleaving scheme and subcarrier frequencies in remaining frequency subsets are allocated to non-participating terminals according to a frequency interleaving scheme.

10. The network element of claim 9 characterized in that it further comprises means for determining the modulation scheme for the subcarriers allocated to the terminals.

11. A user terminal comprising:

means for estimating channel transfer function of the user terminal and interference noise over a certain period of time and reporting back to a network information on whether the channel transfer function is predictable or not and information on whether the user terminal is a participating terminal in a frequency-selective subcarrier allocation method or not through a feedback channel;

means for utilizing subcarrier frequencies in a first subset of subcarrier frequencies allocated to the participating terminals, the subcarrier frequencies in the first subset not being interleaved; and means for utilizing subcarrier frequencies in remaining subsets of the subcarrier frequencies not being allocated to the participating terminals, the subcarrier frequencies in the remaining subsets being interleaved according to a frequency interleaving scheme.

12. A radio resource manager entity comprising:

means for exchange of information with a network element the network element including means for receiving user terminal information about user terminal participation in a frequency-selection allocation method and information about user terminal channel transfer function and interference noise estimate;

wherein a user terminal comprises means for estimating channel transfer function of the user terminal and interference noise over a certain period of time and reporting back to a network information on whether the channel transfer function is predictable and information on whether the user terminal is a participating terminal in a frequency-selective subcarrier allocation method through a feedback channel;

means for partitioning an available subcarrier frequency set into at least two frequency subsets;

means for allocating subcarrier frequencies of a first frequency subset to participating terminals following the frequency-selective allocation scheme by assigning to said terminals subcarriers being useful for non-interleaved transmission according to the user terminal feedback information about the channel transfer function; and means for allocating subcarrier frequencies of a second subset to non-participating terminals according to a frequency interleaving scheme.

13. The radio resource manager entity of claim 12 characterized in that it further comprises means for determining the modulation scheme for the subcarriers allocated to the terminals.

14. A method for allocating subcarrier frequencies to a user terminal in a wireless telecommunications system using multi-carrier modulation in which a network communicates with a plurality of user terminals for data transmission, signaling control and link adaptation via an air interface downlink channel and feedback channel, and where a number of terminals estimate their own specific channel transfer function, described in by the following steps:

upon terminal channel transfer function estimation over a certain period of time, the terminals report back to the network information about their participation in a frequency-selection allocation method or not and information about their measured channel transfer function through the feedback channel and the terminals report to the network, over their feedback channel, if their channel transfer function is predictable and if they want to participate in a frequency-selective subcarrier allocation method; and the network, according to this information, allocates the subcarrier frequencies of at least one frequency subset to the terminals following a frequency-selective allocation scheme by assigning to said terminals subcarriers that are useful for transmission according to their feedback information about the channel transfer function, wherein participating user terminals communicate with the network using allocated and non-interleaved subcarrier frequencies, and wherein non-participating user terminals communicate with the network using remaining ones of the subcarrier frequencies for communication according to a frequency interleaving scheme.

15. The method of claim 14 characterized in that the terminals further report to the network information about interference noise estimate.

16. The method of claim 14 characterized in that said information sent from the terminals to the network through the feedback channel is sent in a coded compressed form.

17. The method of claim 1, wherein the multi-carrier modulation comprises OFDM.

18. The method of claim 7, wherein the source coding algorithm comprises run-length coding.

19. The method of claim 14, wherein the multi-carrier modulation comprises OFDM.

20. The user terminal comprising means of claim 11, wherein said information about their measured channel transfer function and/or interference noise estimate through the feedback channel is reported back to the network in a coded compressed form.

21. A method for allocating subcarrier frequencies to a user terminal in a wireless telecommunications system using multi-carrier modulation in which a network is adapted to communicate with a plurality of user terminals for data transmission, signaling control and link adaptation via an air interface downlink channel and feedback channel, and where a number of terminals estimate their own specific channel transfer function, the method comprising:

a step for estimating terminal channel transfer function over a certain period of time;

a step for reporting to the network by the terminals, over their feedback channel, if their channel transfer function is predictable or not and whether they want to participate in a frequency-selective subcarrier allocation method or not;

a step for partitioning the subcarrier frequency set available in at least two logical blocks or frequency subsets by the network, depending on the information about the number of terminals participating in the frequency-selective allocation procedure, their respective traffic demands and their channel transfer function characteristics;

a step for reporting by the participating terminals back to the network information about their measured channel transfer function and interference noise estimate through the feedback channel; and a step for allocating by the network, according to this information, the subcarrier frequencies of at least one first frequency subset to the participating terminals following a frequency-selective allocation scheme by assigning to said terminals subcarriers that are useful for transmission according to their feedback information about the channel transfer function and allocates the subcarrier frequencies of at least one second frequency subset to the rest of the terminals according to a frequency interleaving scheme.

22. A method for allocating subcarrier frequencies to a user terminal in a wireless telecommunications system using multi-carrier modulation in which a network communicates with a plurality of user terminals for data transmission, signaling control and link adaptation via an air interface downlink channel and feedback channel, and where a number of terminals estimate their own specific channel transfer function, described in by the following steps:

a step for estimating terminal channel transfer function over a certain period of time, a step for reporting to the network by the terminals, over their feedback channel, information about their participation in a frequency-selection allocation method or not and information about their measured channel transfer function;

a step for reporting to the network by the terminals, over their feedback channel, if their channel transfer function is predictable and whether they want to participate in a frequency-selective subcarrier allocation method; and a step for allocating by the network, according to the reported information, the subcarrier frequencies of at least one frequency subset to the terminals following a frequency-selective allocation scheme by assigning to said terminals subcarriers that are useful for transmission according to their feedback information about the channel transfer function, wherein the network communicates with participating terminals using non-interleaved subcarrier frequencies in a first subset of the subcarrier frequencies and communicates with non-participating terminals using interleaved subcarrier frequencies in a second subset of the subcarrier frequencies.

23. A network element comprising:

a receiver operable to receive user terminal information about participation in a frequency-selection allocation method or not, and information about their channel transfer function and interference noise estimate;

wherein a user terminal comprises means for estimating channel transfer function of the user terminal and interference noise over a certain period of time and reporting back to a network information on whether the channel transfer function is predictable and information on whether the user terminal is a participating terminal in a frequency-selective subcarrier allocation method through a feedback channel;

a partitioning module operable to partition the subcarrier frequency set available in at least two frequency subsets; and an allocation module operable to allocate the subcarrier frequencies of at least one first frequency subset to the participating terminals following a frequency-selective allocation scheme by assigning to said terminals subcarriers that are useful for transmission according to their feedback information about the channel transfer function, wherein the network element communicates with participating user terminals using non-interleaved subcarrier frequencies in the first frequency subset and communicates with non-participating user terminals using interleaved subcarrier frequencies in a second frequency subset.

24. The network element of claim 23 further comprising a modulation module for determining the modulation scheme for the subcarriers allocated to the terminals.

25. A user terminal comprising a channel transfer function estimation module operable to estimate its channel transfer function and interference noise over a certain period of time and reporting back to a network information on whether the channel transfer function is predictable or not, information on whether the user terminal is a participating user terminal or a non-participating user terminal in a frequency-selective subcarrier allocation method or not, said information about their measured channel transfer function and interference noise estimate through a feedback channel, wherein participating user terminals communicate with the network using allocated and non-interleaved subcarrier frequencies, and wherein non-participating user terminals communicate with the network using remaining ones of the subcarrier frequencies for communication according to a frequency interleaving scheme.

26. A radio resource manager entity comprising:

a communication module operable to exchange of information with a network element that comprises a receiver operable to receive user terminal information about their participation in a frequency-selection allocation method or not, and information about their channel transfer function and interference noise estimate;

a partitioning module operable to partition the subcarrier frequency set available in at least two logical blocks or frequency subsets; and an allocation module operable to allocate the subcarrier frequencies of at least one first frequency subset to the participating terminals following a frequency-selective allocation scheme by assigning to said terminals subcarriers that are useful for transmission according to their feedback information about the channel transfer function, wherein a user terminal comprises means for estimating channel transfer function of the user terminal and interference noise over a certain period of time and reporting back to a network information on whether the channel transfer function is predictable and information on whether the user terminal is a participating terminal in a frequency-selective subcarrier allocation method through a feedback channel;

wherein the network element communicates with the participating terminals using allocated and non-interleaved subcarrier frequencies, and wherein the network element communicates with non-participating terminals using remaining ones of the subcarrier frequencies for communication according to a frequency interleaving scheme.

27. The radio resource manager entity of claim 26, further comprising a modulation module operable to determine the modulation scheme for the subcarriers allocated to the terminals.

* * * * *